United States Patent [19]

Mochizuki et al.

[11] Patent Number: 5,128,399
[45] Date of Patent: Jul. 7, 1992

[54] INJECTION-MOLDABLE POLYBUTYLENE TEREPHTHALATE RESIN COMPOSITIONS AND MOLDED ARTICLES OF THE SAME

[75] Inventors: Mitsuhiro Mochizuki; Mitsuo Wada; Hiromitsu Seitoh, all of Shizuoka, Japan

[73] Assignee: Polyplastics Co., Ltd., Osaka, Japan

[21] Appl. No.: 727,249

[22] Filed: Jul. 11, 1991

[30] Foreign Application Priority Data

Jul. 27, 1990 [JP] Japan .................. 2-200966
Apr. 5, 1991 [JP] Japan .................. 3-73050

[51] Int. Cl.⁵ .............................................. C08K 5/10
[52] U.S. Cl. ............................................... 524/318
[58] Field of Search ..................................... 524/318

[56] References Cited

U.S. PATENT DOCUMENTS 4,098,752  7/1978  Ohkawa et al. .
4,396,730  8/1983  Imahashi ................ 524/394
4,421,804  12/1983  Mori et al. .
4,675,356  6/1987  Miyata ................ 524/424
4,707,511  11/1987  Boutni .

FOREIGN PATENT DOCUMENTS 2531963  12/1976  Fed. Rep. of Germany .

OTHER PUBLICATIONS

Derwent Assession No. 84-260 767, Questel Telesystems (WPIL), Derwent Publications Ltd., London, Abstract & JP-A-59 852.

*Primary Examiner*—Morton Foelak
*Attorney, Agent, or Firm*—Nixon & Vanderhye

[57] ABSTRACT

Polybutylene terephthalate (PBT) injection-molding compositions exhibit improved mold-release properties and sufficient extruder screw "bite" during injection molding. The PBT compositions are a polyblend of a PBT base resin with an effective amount (preferably between about 0.01 to 10 parts by weight) of a processing aid which is a sorbitan ester of a fatty acid having at least 12 carbon atoms. The PBT injection molding compositions of the invention may be used in a variety of end-use applications (e.g., the automotive and/or electronic industries) to form stable injection-molded thin-walled and/or complex-shaped articles.

4 Claims, No Drawings

INJECTION-MOLDABLE POLYBUTYLENE TEREPHTHALATE RESIN COMPOSITIONS AND MOLDED ARTICLES OF THE SAME

FIELD OF THE INVENTION

The present invention generally relates to injection-moldable polybutylene (PBT) resin compositions. More specifically, the present invention is embodied in PBT compositions that are relatively easily processible by injection molding techniques due to the exceptional mold release and extruder screw "bite" characteristics that the compositions exhibit.

BACKGROUND AND SUMMARY OF THE INVENTION

Crystalline thermoplastic polybutylene terephthalate (PBT) resins have been used extensively as an engineering plastic in various fields owing to their excellent mechanical and electrical properties, as well as their physical and chemical characteristics. Thus, thermoplastic PBT resins have been used to form molded parts in various fields including automotive, electrical and electronic end-use applications.

The injection molding of PBT is known to be generally easier as compared to the injection molding of polyethylene terephthalate (PET) resins. However, when PBT resins are molded into relatively small articles or articles having a complex shape and/or thin walls, various problems ensue such as distortion and breakage of the articles owing to poor mold release properties. As a result, there have been previous attempts to improve the processability of PBT during injection molding by the addition of various mold-release agents, such as paraffin oil, fatty acid amides and fatty acid esters.

However, PBT injection-molding compositions which contain a conventional mold-release agent exhibit problems during the injection-molding process. That is, PBT compositions which contain conventional mold-release agents typically exhibit poor "bite" in the extruder which results in the pellets slipping on the screw of the injection-molding machine. This "slippage" of conventional PBT resins is presumably due to the bleed-through of the mold-release agents when the pellets are pre-dried prior to injection-molding. As a result, the pellets are insufficiently plasticized and therefore are injection-molded with some difficulty. Furthermore, when injection-molded articles are formed, they are often unstable (e.g. degrade and/or discolor) over prolonged periods of use.

It is also conventional and highly desirable to recycle scrap thermoplastic material in order to reduce the production costs of final articles. However, the problem of poor extruder screw "bite" becomes even more apparent when scrap thermoplastic material is employed in the injection-molding process. That is, when scrap thermoplastic material is added to virgin thermoplastic material, poor extruder screw "bite" will cause insufficient mixing and plasticization of the scrap and virgin thermoplastic material.

The problem of poor extruder screw "bite" has been solved to some extent by the deposition of a metal soap on the surface of the pellets prior to injection-molding. However, deposition of a metal soap presents its own problems in that it further complicates the injection-molding operation (e.g. since a further additive must be handled and processed), as well as contributing to corrosion of metal parts of the processing machinery in which it comes into contact.

What has been needed, therefore, is a polybutylene terephthalate injection-molding resin composition which is relatively easily processable (i.e., exhibits sufficient extruder screw "bite" during injection molding), while at the same time has satisfactory mold-release properties and long-term stability. It is towards attaining such a PBT injection-molding resin that the present invention is directed.

Broadly, the present invention is embodied in stable, injection-moldable PBT resin compositions which not only exhibit excellent mold-release characteristics, but which also have satisfactory extruder screw "bite" when pellets of the composition are employed in injection-molding machines. As a result, the PBT injection-molding compositions may be employed to form injection molded articles which remain stable after prolonged periods of use.

In specific embodiments, the PBT injection-molding compositions of the present invention include (A) 100 parts by weight of a polybutylene terephthalate base resin melt-blended with (B) between about 0.01 to 10 parts by weight of a processing aid which is a sorbitan ester of a fatty acid having at least 12 carbon atoms.

Further aspects and advantages of the present invention will become more clear after careful consideration is given to the detailed description of the preferred exemplary embodiments thereof which follow.

DETAILED DESCRIPTION OF THE PREFERRED EXEMPLARY EMBODIMENTS

The PBT base resin A that may be used in the compositions of the present invention is a polybutylene terephthalate prepared by the polycondensation of 1,4-butanediol with terephthalic acid or an ester thereof with a lower alcohol. The PBT base resin may thus be a copolymer containing at least 70% by weight of polybutylene terephthalate units in the polymeric chain. Suitable comonomers include dibasic acid components other than terephthalic acid or lower alcohol esters thereof, for example, aliphatic and aromatic polybasic acids such as isophthalic, naphthalenedicarboxylic, adipic, sebacic, trimellitic and succinic acids and ester-forming derivatives thereof; aromatic hydroxy carboxylic acids such as hydroxybenzoic and hydroxynaphthoic acids and ester-forming derivatives thereof; and glycol components other than 1,4-butanediol, for example, conventional alkylene glycols such as ethylene glycol, diethylene glycol, propylene glycol, trimethylene glycol, hexamethylene glycol, neopentyl glycol and cyclohexanedimethanol; lower alkylene glycols such as 1,8-octanediol; aromatic alcohols such as bisphenol A and 4,4'-dihydroxybiphenyl; alkylene oxide/alcohol adducts such as adduct of bisphenol A with two ethylene oxide molecules and adduct of bisphenol A with two propylene oxide molecules; and polyhydroxy compounds such as glycerol and pentaerythritol and ester-forming derivatives thereof.

Although virtually all polybutylene terephthalates prepared by the polycondensation of the monomers as described above may be used as the PBT base resin in the compositions of the present invention, it is preferred to use linear or branched polybutylene terephthalates or a mixture of resins having polybutylene terephthalate as a major component. The term "branched" PBT resin as used in this specification and in the accompanying claims is intended to refer to a polybutylene terephthalate or polyester mainly comprised of butylene terephthalate units having a branch formed by the presence of a polyfunctional compound. Suitable polyfunctional compounds that may be employed to form branched polybutylene terephthalate resins include trimesic, trimellitic and pyromellitic acids, alcohol esters thereof; and glycerol, trimethylolethane, trimethylolpropane and pentaerythritol.

The processing aid that is blended with the PBT base resin to form the compositions of the present invention is a sorbitan ester of a fatty acid having at least 12 carbon atoms. Examples of the fatty acid moiety include lauric, oleic, palmitic, stearic, behenic and montanic acids. Preferably, the fatty acid moiety has 16 to 32 carbon atoms, more preferably 18 to 22 carbon atoms. When a fatty acid moiety having less than 12 carbon atoms is used, insufficient mold release characteristics are obtained. On the other hand, when a fatty acid ester moiety having more than 32 carbon atoms is used, the heat resistance of the compositions is undesirably lowered.

The sorbitan ester of a fatty acid which is used as the processing aid in the compositions of the present invention can be prepared by any conventional process. It is desirable that the esterification be controlled so as to give an ester having a hydroxyl number of between 50 to 400, preferably between 100 to 300, and most preferably between 150 to about 300 as determined by the pyridine-acetic anhydride method according to the Japan Oil Chemists' Society 2, 4, 9, 2-71 hydroxy number. When the hydroxyl number is less than 50, the resulting pellets will exhibit sorbitan ester "bleed-through" during predrying so that the metering time scatters during prolonged molding operations, thereby preventing stable molding. On the contrary, when the hydroxyl number is 400 or above, the heat resistance of the compositions is undesirably lowered.

Preferred examples of the sorbitan ester include monopalmitate, monostearate, distearate, tristearate, monobehenate, dibehenate, tribehenate and monomontanate. Most preferred are esters of sorbitan with stearic or behenic acid, i.e., sorbitan monostearate, sorbitan distearate, sorbitan monobehenate and sorbitan dibehenate.

The amount of the sorbitan ester processing aid used in the compositions of this invention is between about 0.01 to 10 parts by weight, preferably between about 0.1 to 2 parts by weight per 100 parts by weight of the PBT base resin. If the amount of the processing aid is too small, the resulting composition will exhibit poor extruder screw "bite", while if excessive amounts are used, the mechanical properties will be lowered unfavorably.

The compositions of the present invention may further contain minor amounts of other thermoplastic resins as an auxiliary component, provided the benefits obtained by the present invention are not hindered. The auxiliary thermoplastic resins that may be used may be any thermoplastic that is stable at high temperatures. Examples of auxiliary thermoplastic resins include polyamide, ABS, polyphenylene oxide, polyalkyl acrylate, polyacetal, polysulfone, polyether sulfone, polyether imide, polyether ketone, fluororesin and polyethylene terephthalate. Two or more such auxiliary thermoplastic resins may be used, if desired.

The compositions of the present invention may also contain conventional additives which are typically incorporated into thermoplastic resins in order to impart desired property characteristics in dependence upon the end-use application. Examples of such conventional additives include stabilizers such as antioxidants, heat stabilizers and ultraviolet absorbers; antistatic agents; flame retardants; coloring agents such as dyes and pigments; lubricants; plasticizers; crystallization accelerators; nucleating agents and inorganic fillers.

Examples of inorganic fillers include conventional inorganic fibers such as fibers formed of glass, carbon, ceramic, boron, potassium titanate, and asbestos; powdery materials such as calcium carbonate, highly dispersible silicates, alumina, aluminum hydroxides, talc, clay, mica, glass flakes, glass powders, glass beads, quartz powders, siliceous sand, wollastonite, carbon black, barium sulfates, plaster of Paris, silicon carbide, boron nitride and silicon nitride; flaky inorganic materials and whiskers. These inorganic fillers may be used either alone or as a mixture of two or more of the same.

The compositions of the present invention can be easily prepared by conventional processing techniques typically employed to prepare resin compositions using conventional processing equipment. For example, the compositions can be prepared by mixing necessary components together, kneading and extruding the obtained mixture into pellets with an extruder and then molding the pellets. Alternatively, different pellets may be mixed with one another according to a predetermined ratio followed by molding the resulting pellet mixture to obtain a molded article having the desired composition according to the present invention. Furthermore, one or more of the necessary components may be fed directly into a molding machine to be simultaneously melt-blended and molded into an article. A portion of the resin components can preliminarily be pulverized and thereafter mixed with the rest of the components so as to obtain a homogeneous dispersion throughout the composition.

The polybutylene terephthalate resin composition of the present invention containing a specific sorbitan ester as a processing aid is superior to prior art compositions containing various lubricating oils or fatty acid amides which have been incorporated for the same purpose. Thus, the compositions of this invention exhibit excellent extruder screw "bite" which does not deteriorate even when scraps of the PBT composition are recycled and mixed with virgin pellets of the PBT resin composition. By virtue of the benefits described above, the compositions of the present invention may be used advantageously to form injection-molded parts having thin walls and/or a complex shape, for example, various gears or connectors for automobiles and/or electric appliances.

Further aspects of this invention will become more clear from the following non-limiting Examples.

EXAMPLES

Examples 1 to 7 and Comparative Examples 1 to 3

Various sorbitan esters were each added to polybutylene terephthalate at a ratio specified in Table 1. The obtained mixtures were each melt-blended with a twin-screw extruder to form pellets. The pellets were then injection-molded into evaluation test pieces.

For comparison, the same procedure as that described above was repeated except that either no sorbitan ester was used, or that a fatty acid amide or other fatty acid ester was used instead of the sorbitan ester. These comparative results are also given in Table 1.

The evaluation methods used were as follows.

(1) Hydroxyl Number:

Determined by the analytical methods of the Japan Oil Chemists' Society: 2,4,9,2-71 hydroxyl number (pyridine-acetic anhydride method).

(2) Evaluation of Extruder Screw Bite:

The molding of a box (D 75 mm ×W 40 mm ×H 40 mm) was repeated under the conditions described below to measure the metering time (plasticization time). A lower average value or less scattering denotes a better screw "bite" into the pellets. The average, maximum and minimum values of 200-shot moldings are given as the results.

The evaluation was conducted with respect to two kinds of pellets—one being pellets formed entirely of virgin resin, and the other being pellets containing 50% of reprocessed material (formed by the pulverization of previously molded articles).

| molding machine: | Toshiba IS 30 EPN | | | |
|---|---|---|---|---|
| cylinder temp: | 260 (nozzle) | 250 (H3) | 240 (H2) | 240° C. (H1) |
| mold temperature: | 60° C. | | | |
| screw speed: | 160 rpm. | | | |

(3) Mold Release Characteristics

The same box as that prepared to evaluate the screw "bite" as described above was molded under the same conditions and evaluated for distortions caused by pin-ejection from the mold according to the following criteria:

○: no distortion
Δ: slight distortion
×: significant distortion (4) Visual Inspection of Molded Article:

A flat plate (50 mmL×50 mmW ×3 mmT) was molded and aged at 120° C. for 100 hours. The change in the surface of the plate due to bleed-through of the additive components was examined visually and evaluated according to the following qualitative criteria:

1 ... no change in surface gloss
2 ... slightly reduced surface gloss
3 ... greatly reduced surface gloss
4 ... greatly reduced surface gloss with slight bleed-through
5 ... significant bleed-through and significantly reduced surface gloss

TABLE 1

| | | | | Ex. No. | | | | |
|---|---|---|---|---|---|---|---|---|
| | | | unit | 1 | 2 | 3 | 4 | 5 |
| Composition | polybutylene terephthalate | | (pts. by wt.) | 100 | 100 | 100 | 100 | 100 |
| | sorbitan monostearate (hydroxyl number: 260) | | (pts. by wt.) | 0.1 | 0.3 | 0.5 | — | — |
| | sorbitan distearate (hydroxyl number: 190) | | (pts. by wt.) | — | — | — | 0.3 | — |
| | sorbitan monobehenate (hydroxyl number: 205) | | (pts. by wt.) | — | — | — | — | 0.3 |
| | sorbitan tribehenate (hydroxyl number: 70) | | (pts. by wt.) | — | — | — | — | — |
| | sorbitan monomontanate (hydroxyl number: 285) | | (pts. by wt.) | — | — | — | — | — |
| | ethylenebisstearylamide (hydroxyl number: 0) | | (pts. by wt.) | — | — | — | — | — |
| | stearyl stearate (hydroxyl number: 3) | | (pts. by wt.) | — | — | — | — | — |
| Characteristics | bite into pellets (metering time) | first run of molding | x̄ sec | 2.1 | 2.3 | 2.4 | 2.3 | 2.4 |
| | | | MAX sec | 2.3 | 2.4 | 2.6 | 2.5 | 3.2 |
| | | | MIN sec | 1.8 | 1.8 | 2.0 | 1.9 | 1.8 |
| | | addition of 50% reprocessed material | x̄ sec | 2.2 | 2.4 | 2.6 | 2.4 | 2.5 |
| | | | MAX sec | 3.0 | 3.1 | 3.5 | 3.3 | 3.0 |
| | | | MIN sec | 1.9 | 2.0 | 2.2 | 2.0 | 2.1 |
| | visual inspection (after aging (120° C. × 100 hr)) | | — | 1 | 1 | 1 | 1 | 1 |
| | mold release characteristics | | — | ○ | ○ | ○ | ○ | ○ |

| | | | | Ex. No. | | Comp. Ex. No. | | |
|---|---|---|---|---|---|---|---|---|
| | | | unit | 6 | 7 | 1 | 2 | 3 |
| Composition | polybutylene terephthalate | | (pts. by wt.) | 100 | 100 | 100 | 100 | 100 |
| | sorbitan monostearate (hydroxyl number: 260) | | (pts. by wt.) | — | — | — | — | — |
| | sorbitan distearate (hydroxyl number: 190) | | (pts. by wt.) | — | — | — | — | — |
| | sorbitan monobehenate (hydroxyl number: 205) | | (pts. by wt.) | — | — | — | — | — |
| | sorbitan tribehenate (hydroxyl number: 70) | | (pts. by wt.) | 0.3 | — | — | — | — |
| | sorbitan monomontanate (hydroxyl number: 285) | | (pts. by wt.) | — | 0.3 | — | — | — |
| | ethylenebisstearylamide (hydroxyl number: 0) | | (pts. by wt.) | — | — | — | 0.3 | — |
| | stearyl stearate (hydroxyl number: 3) | | (pts. by wt.) | — | — | — | — | 0.3 |
| Characteristics | bite into pellets (metering time) | first run of molding | x̄ sec | 2.5 | 2.7 | 2.0 | 11.0 | 11.3 |
| | | | MAX sec | 3.0 | 3.5 | 2.1 | 18.5 | 20.5 |
| | | | MIN sec | 1.9 | 2.1 | 1.8 | 3.2 | 3.6 |
| | | addition of 50% reprocessed | x̄ sec | 5.8 | 3.2 | 2.3 | 15.8 | 16.2 |
| | | | MAX sec | 7.1 | 4.0 | 3.1 | 22.3 | 25.0 |

TABLE 1-continued

| material | MIN | sec | | | | | |
|---|---|---|---|---|---|---|---|
| | | | 2.2 | 2.2 | 1.8 | 5.0 | 6.2 |
| visual inspection (after aging (120° C. × 100 hr)) | | — | 2 | 1 | 1 | 5 | 4 |
| mold release characteristics | | — | ○ | ○ | x | ○ | ○ |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A polybutylene terephthalate injection-molding composition comprising a melt blend of:
   (A) 100 parts by weight of a polybutylene terephthalate base resin; and
   (B) an effective amount of between about 0.01 to 10 parts by weight of a processing aid which is an ester of sorbitan with stearic or behenic acid, and which has a hydroxyl number of between 50 to 400.

2. A polybutylene terephthalate resin composition as in claim 1, wherein the sorbitan ester processing aid has a hydroxyl number of between 150 to 300.

3. An injection-molded article consisting essentially of a polybutylene terephthalate composition which comprises a melt blend of:
   (A) 100 parts by weight of a polybutylene terephthalate base resin; and
   (B) an effective amount of between about 0.01 to 10 parts by weight of a processing aid which is an ester of sorbitan with stearic or behenic acid, and which has a hydroxyl number of between 50 to 400.

4. An injection-molded article as in claim 3, wherein the sorbitan ester processing aid has a hydroxyl number of between 150 to 300.

* * * * *